Figure 1:
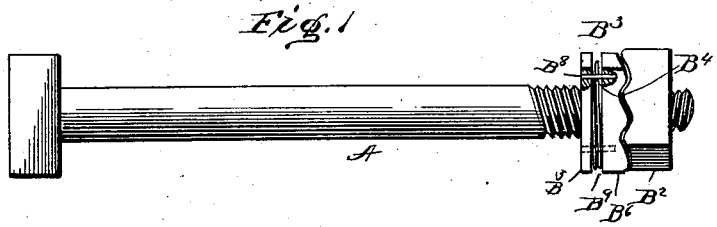

(No Model.)

W. A. MATTER.
NUT LOCK.

No. 533,909. Patented Feb. 12, 1895.

Witnesses:
J. M. Fowler Jr.
C. J. Brown.

Inventor:
Wm. A. Matter
By Davis & Co.
Attorneys.

UNITED STATES PATENT OFFICE.

WILLIAM A. MATTER, OF WILLIAMSPORT, PENNSYLVANIA.

NUT-LOCK.

SPECIFICATION forming part of Letters Patent No. 533,909, dated February 12, 1895.

Application filed June 22, 1894. Serial No. 515,410. (No model.)

*To all whom it may concern:*

Be it known that I, WILLIAM A. MATTER, a citizen of the United States, residing at Williamsport, in the county of Lycoming and State of Pennsylvania, have invented a certain new, useful and valuable Improvement in Lock-Nut Bolts, of which the following is a full, clear, and exact description.

My present invention relates to nut-locks, and bolts therefor, and has for its object to provide a device of this character which shall be simple and durable in construction, easy of application, and inexpensive in its manufacture.

It is a further object of my invention to provide a yielding, two-part nut for nut-locks, adapted to be used in connection with the ordinary nut hereinafter described and illustrated in the drawings.

In order to enable others skilled in the art to make and use my improved nut and bolt-lock, I will proceed to describe the same in detail, reference being had to the accompanying drawings, in which—

Figure 2:
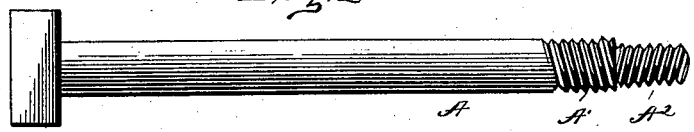
Figure 3:
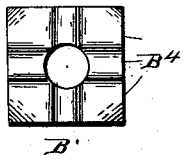
Figure 4:
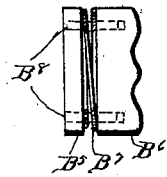
Figure 5:
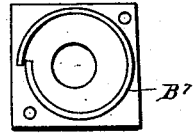
Figure 6:
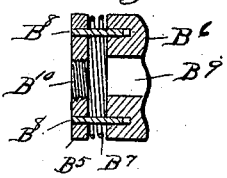

Figure 1, is a view showing my complete device, a portion of the two-part nut being broken away to show one of the connecting pins. Fig. 2, is a view showing the bolt with the lock-nuts removed. Fig. 3, is a detail view of one of the parts. Fig. 4, is a detailed view of the two-part nut. Fig. 5, is a top view of the same. Fig. 6, is a sectional elevation of the two-part nut constructed according to my invention.

Similar characters of reference indicate like parts throughout the several figures.

The bolt A, is provided at one of its ends with a right-hand screw-thread A' and a left-hand screw-thread A², upon which work correspondingly cut nuts B', and B², respectively, the inner or contacting surfaces of these nuts being ridged, as shown.

Referring more particularly to Figs. 4 and 6 of the drawings, I have shown, in detail, the construction of the yielding two-part nut B', which consists of the parts B⁵ and B⁶, normally held separated by a spring B⁷, located between the two parts of said nut B', and kept from turning upon each other by the pins B⁸, that project laterally from the inner face of the part B⁵, of the yielding nut, and enter corresponding recesses in the part B⁶, of said nut. The part B⁵ of the two-part yielding nut is provided with a screw threaded orifice B¹⁰ to receive the bolt A, while the part B⁶ of the yielding nut is provided with a plain recess or orifice, B⁹, so that the same will be free to ride back and forth over the threaded portion of the bolt, and upon the pins B⁸.

In using my improved nut-lock and bolt, I first set the yielding two-part nut B', by turning it to the right upon the bolt, a sufficient distance. Then I put on the lock-nut B², and by turning it to the left I bring it up close to the two-part nut until their adjacent faces touch or meet, and I then give the nut B² an additional half turn to the left which springs the part B⁶, of the two-part nut backward against the tension of the spring B⁷, so long as the ridges on the adjacent faces of the nuts are in contact with each other, but upon turning the nut B², still a little farther toward the left until the ridges B⁴, engage with the grooves on the part B⁶ of the two part nut, the latter will spring forward under the impulse of the spring B⁷, and cause the two nuts to interlock, whereby they are held from turning or shifting upon the bolt.

What I claim as my invention is—

1. In a nut lock, the combination with the bolt A, having right and left hand screw-threads upon one of its ends, of a nut screwed upon one portion of the bolt and consisting of the parts B⁵ and B⁶, pins B⁸, projecting from the face of one of said parts and adapted to enter corresponding recesses in the face of the adjacent part, a spring B⁷, located between the two parts of said nut and adapted to keep the latter normally separated, corrugations on the outer face of one of said parts, and a nut B², screwed upon the outer threads of said bolt and having corrugations upon its inner face, the corrugations of said nut B² being adapted to engage with the corrugations on the face of the part nut, substantially as described.

2. A yielding nut for nut locks consisting of the parts B⁵ and B⁶, pins B⁸, projecting from one of said parts and entering corresponding recesses in the adjacent part, and a spring located between the two parts of said nut and adapted to normally keep the same separated, substantially as described.

In testimony whereof I affix my signature in presence of two witnesses.

WILLIAM A. MATTER.

Witnesses:
BROOKS BISHOP,
JAMES I. PAUL.